United States Patent [19]

Naiwirt

[11] Patent Number: 4,670,902

[45] Date of Patent: Jun. 2, 1987

[54] CIRCUITRY FOR TELEPHONE SYSTEMS

[75] Inventor: Erich Naiwirt, Wien, Austria

[73] Assignee: ITT Austria Gesellschaft m.b.H., Vienna, Austria

[21] Appl. No.: 784,412

[22] Filed: Oct. 4, 1985

[30] Foreign Application Priority Data

Oct. 5, 1984 [AT] Austria .................................. 3167/84

[51] Int. Cl.$^4$ ............................................. H04M 1/76
[52] U.S. Cl. ..................................... 379/338; 379/340; 379/399
[58] Field of Search ........... 179/16 F, 16 AA, 18 FA, 179/170 R, 170 NC; 379/338, 339, 340, 341, 342, 344, 349, 345, 348, 387, 395, 394, 399, 402

[56] References Cited

U.S. PATENT DOCUMENTS

| | | | |
|---|---|---|---|
| 3,903,378 | 9/1975 | Lee et al. | 179/170 R |
| 3,932,712 | 1/1976 | Suntop | 179/170 R |
| 4,074,087 | 2/1978 | Blake, Jr. et al. | 179/170.2 |
| 4,096,363 | 6/1978 | Earp | 179/170 R |
| 4,229,625 | 10/1980 | Derby et al. | 179/170 R |
| 4,331,842 | 5/1982 | Kiko | 179/170 NC |
| 4,600,811 | 7/1986 | Hayashi et al. | 179/16 AA |

*Primary Examiner*—Gene Z. Rubinson
*Assistant Examiner*—R. Vaas
*Attorney, Agent, or Firm*—John T. O'Halloran

[57] ABSTRACT

The invention refers to a circuit for telephone systems for the transmission of alternating current signals such as voice signals from a subscriber telephone system to a central office, wherein a signal transformer is provided with a by-pass for the direct current running in both wires to the central office. According to the invention a current path is provided by an amplifier inserted between the two wires to the central office. The amplifier is controlled by the dc current from the central office and alternating current provided by the transformer. The resistance of the amplifier changes according to control signals in the form of current supplied. The application of an amplifier as a current path between the two wires of the central office enables maintenance of direct and alternating current in the central office and simultaneous transmission and amplification of voice signals. The transformer need only supply a small part of the analog transmission signal energy. Thus a considerable reduction of transformer size is possible without any deterioration in the quality of signal transmission.

6 Claims, 1 Drawing Figure

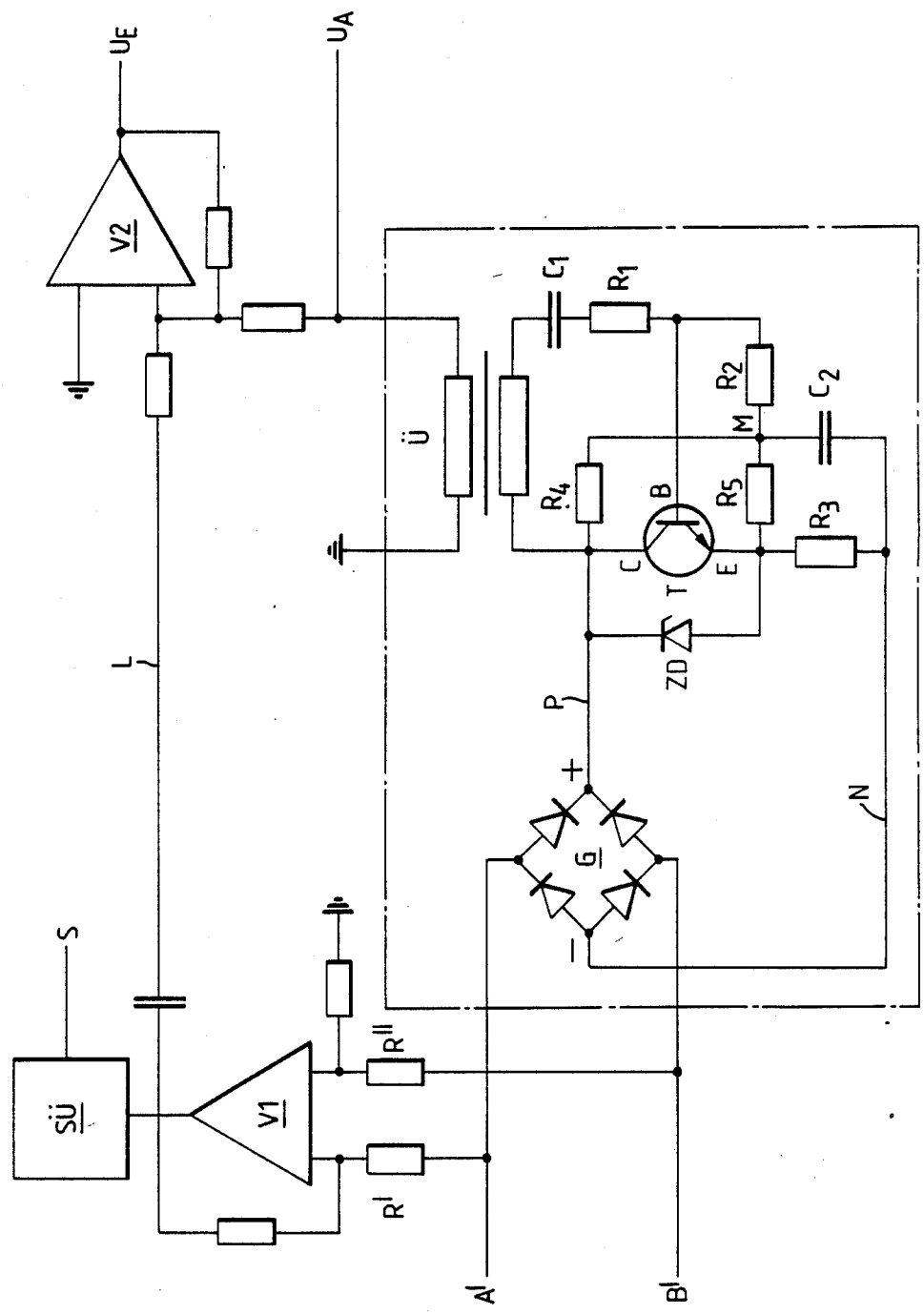

CIRCUITRY FOR TELEPHONE SYSTEMS

BACKGROUND OF THE INVENTION

The invention refers to a circuitry for telephone systems for the transmission of alternating current signals from a subsequent telephone system to a supplying exchange, whereby a signal transformer is provided with a by-pass for the direct current in both lines of the supplying exchange.

Signal transformers are typically used in telephone systems for voice signal transmission from subordinate telephone systems such as PBX, PABX or other subscriber systems to a superior supplying exchange such as a central office. These signal transformers are employed for the voice signal as well as for the direct current provided by the supplying exchange which is necessary for the transmission of communication signalling. Due to the qualitative requirements of signal transmission the transformers are comparatively large, heavy and expensive. By series connection with a capacitor it is possible to keep the direct current of the supplying exchange away from the transformer and thus to avoid DC magnetization of the transformer. This allows the size of the transformer to be reduced. However the size reduction is limited because the total analog transmission signal energy still must be transmitted to the supplying exchange or central office.

Moreover, conventional circuitry is required to provide a by-pass for the transformer and the capacitor to maintain the direct current flow in the line of the superior exchange. For this purpose a coil with a relatively high inductance is used which causes additional circuit complexity. Another solution for the current path is electronic circuitry with a transistor, which, if appropriately equipped forms an impedance making direct current flow possible. This transistor circuit requires considerable complexity and does not enable a substantial reduction of transformer dimensions.

SUMMARY OF THE INVENTION

An object of this invention is to improve conventional circuits enabling a considerable reduction of transformer dimensions even if circuit complexity is low.

This task is solved accordingly to the invention by providing a current path consisting of an amplifier inserted between the two lines of the supplying exchange which is controlled by the current of the supplying exchange and alternating current or voice signals transmitted by the transformer. The resistance of the amplifier changes according to the control signals. The use of an amplifier as a current path between the two lines (tip and ring) of the superior exchange makes it possible to maintain the flow of direct and alternating current in the superior exchange and to transmit and amplify voice signals simultaneously. The transformer has to transmit only a small part of the analog transmission signal energy. Thus a considerable reduction of transformer dimensions is possible without a deterioration of the quality of signal transmission.

A preferred embodiment of the present invention employs an amplifier having a transistor having its collector and emitter inserted between the two lines of the supplying exchange and the transformer inserted between the collector and the base of the transistor. This is a simple circuit with low complexity. The transformer need only supply the base current for controlling the transistor which operates as a gyrator and transmits an amplified voice signal.

A further improvement according to the invention may be attained if a voltage divider is inserted between the two lines of the supplying exchange. The voltage divider may comprise two resistors whose center is connected to the base of the transistor via a series resistance. By this voltage divider and the series resistance the control current at the base of the transistor is defined. By the variation of the resistance values of the resistors the terminating impedance for the supplying exchange and therewith the current can be adjusted.

A further feature of this invention is that a capacitor may be inserted in the voltage divider connected to a line of the supplying exchange which is connected to the emitter of the transistor. By appropriate dimensioning of the capacitance of this capacitor the AC component may also be employed to control the base of the transistor. Thus it is possible to independently select the direct current impedance and the alternating current impedance of the circuitry.

A further variation of the invention provides for the primary of the transformer at the side of the subordinate telephone system to be grounded. This permits a further simplification of the circuitry according to the invention.

In addition both wires of the supplying exchange may be connected through a rectifier, whereby the input of the circuitry of the present invention is rendered independent of the polarity of the direct current supplied by the superior supplying exchange. Thus the circuitry is protected against damage which may be caused by wrong polarity.

BRIEF DESCRIPTION OF THE DRAWING

Further details and advantages of the invention can be seen from the practical example described below in connection with the FIGURE which depicts the circuitry according to the invention as part of a telephone system.

DESCRIPTION OF THE PREFERRED EMBODIMENT

In the FIGURE the lines or wires of a superior supplying exchange such as a central office are indicated as A' and B'. The AC voice signal fed via these lines is applied to an amplifier V1 through two high-ohmic resistors R' and R", to which a loop control or signalling unit SU is connected. The loop control unit SU indicates at an output S whether the superior exchange supplies via line A' or B' and this provides DC and DC signalling information to the PBX or PABX. The incoming voice signal which is received as a two-wire-signal from the lines A' and B' is supplied to another amplifier V2 via a line L. The amplifier V2 converts the voice signal to a ground referenced input signal $U_E$. Assisted by the circuitry according to the invention which is framed by a dash-dotted line, the outgoing transmission signal $U_A$ as applied by the PBX or PABX is transmitted to lines A' and B' of the central or supplying exchange.

The outgoing transmission signal $U_A$ which is groundrelated as well is transmitted to the circuitry after it has been galvanically separated via a signal transformer U. This circuitry is connected with the Lines A' and B' of the supplying exchange via a rectifier bridge G. Moreover, an amplifier which consists of a transistor T is inserted between the two terminals P and N of the rectifier bridge G. This amplifier by-passes the signal transformer U and creates a current path between the lines A' and B' of the supplying exchange.

The collector C of transistor T is connected to the positive line P of bridge G, and the emitter E is connected via a resistor $R_3$ to the negative line N of the DC voltage output of the rectifier bridge G. A Zener diode ZD is inserted between emitter E and collector C to protect transistor T. The base B of transistor T is controlled by signal transformer U whose secondary side is connected between the positive line P and the base B of transistor T through a resistor $R_1$ and a capacitor $C_1$. The resistor $R_1$ and capacitor $C_1$ are connected in series between the base B and signal transformer U. The transistor T is controlled by a voltage divider whose centre M is connected with base B of transistor T via a series resistor $R_2$. The voltage divider consists of two resistors $R_4$ and $R_5$ inserted between the positive line P of the rectifier bridge G and the emitter E. The emitter E is connected to the negative line N via the resistor $R_3$. The centre M of the voltage divider formed by resistors $R_4$ and $R_5$ is connected to the negative line N of the direct voltage output of the rectifier bridge G via a capacitor $C_2$.

Thus, base B of transistor T is double-controlled. The voltage divider consisting of resistors $R_4$, $R_5$ and the series resistor $R_2$ define the direct current resistance of the circuitry in relation to the lines A' and B' and therewith the direct current flowing through the current path created by transistor T. Thus, the direct current resistance of the circuitry and the direct current can be varied and adjusted by selection of the values of the series resistor $R_2$ and resistors $R_4$ and $R_5$ of the voltage divider. The direct current depends on the supply current and decreases when the supply current increases. The direct current resistance $R_{A'B'}$ results from the formula:

$$R_{A'B'} = R_3 + \frac{U_{BE} \cdot \left(1 + \frac{R_4}{R_5}\right) + U_{BG}}{I_{A'B'}},$$

where $U_{BE}$ denotes the base-emitter voltage of transistor T, $U_{BG}$ equals the voltage drop at the rectifier bridge G and $I_{A'B'}$ equals the current flowing in the lines A' and B'.

The alternating current impedance of the circuit results from controlling the base B of the transistor T via the resistors $R_1$ and $R_2$. Since the impedances of the two capacitors $C_1$ and $C_2$ can be neglected due to their low value, junction M of voltage divider $R_4$, $R_5$ acts as if it were connected to ground. At the base B of transistor T a modulation is affected because the alternating current impedance between centre M and collector C of transistor T which connect between the Lines A' and B' of the superior exchange, has a very low-ohmic value compared with the rest of the circuitry due to the high-ohmic value of resistors $R_1$ and $R_2$. Thus ideal modulation at base B of the transistor T via the voltage divider consisting of the resistors $R_1 + R_2$ may be taken for granted. Consequently, the alternating current impedance $Z_{A'B'}$ between the two lines A' and B' of the circuitry can be calculated by the formula $$Z_{A'B'} = R_3 \cdot \left(1 + \frac{R_1}{R_2}\right)$$

under the condition that the base current of transistor T is small enough to be neglected.

The circuitry described above includes the ability to choose the direct current resistance as well as the alternating current impedance reflected to the lines A' and B' of the superior supplying exchange. This may be done in a wide range, independently of the other impedance which makes it easy to meet the respective practical interconnect requirements.

The design of the respective circuitry according to the invention may be dimensioned according to the following example:

| | | |
|---|---|---|
| $R_1$ = 10 kOhm | $R_4$ = 10 kOhm | $C_1$ = 1 uF |
| $R_2$ = 1,3 kOhm | $R_5$ = 3,3 kOhm | $C_2$ = 10 uF |
| $R_3$ = 68 Ohm | | |
| $I_{A'B'}$ = 25 mA | | |
| $R_{A'B'}$ = 212 Ohm | | $Z_{A'B'}$ = 600 Ohm |

The respective circuitry operates in the following manner. The outgoing transmission signal $U_A$ is applied to the signal transformer U which is operating with one terminal grounded at the primary side. The signal obtained at the secondary is transferred as a control signal to base B of transistor T through capacitor $C_1$ and resistor $R_1$.

Transistor T operates as an amplifier and transfers the outgoing transmission signal as an amplified alternating current signal to the lines A' and B' of the superior exchange through bridge G. The direct current flowing through the lines A' and B' is transferred to the circuitry via the rectifier bridge G which renders the input of the circuitry independent of polarity. This direct current also controls the base B of transistor T via the voltage divider formed by resistors $R_4$ and $R_5$ and the series resistor $R_2$. Therefore, in this manner transistor T forms a current path for the direct current supplied by the central office.

Thus the transformation and transmission of the outgoing transmission signal from the subordinate telephone system to the supplying exchange and the simultaneous direct current supply are guaranteed. Because the amplification of transistor T may be relatively high the main part of the current flowing between the lines A' and B' is supplied by transistor T. The dimension of the signal transformer U may be relatively very small because only little current is necessary to control base B of transistor T. The circuitry described above has the special feature of simplified circuitry and relatively small required components.

I claim:

1. Apparatus for transmittng alternating current signals such as voice signals from a subscriber telephone system to a central office over two wires provided from said control office comprising:

signal transformer means having a by-pass for direct current present in both of said two wires from said central office, said signal transformer means receiving alternating current representing alternating current signals to by applied to said central office from said subscriber telephone system; and current path means including amplifier means for applying said alternating current signals to said two wires provided by said central office, said amplifier means being connected between said two wires and receiving direct current provided by said central offices therefrom, said amplifier means additionally being connected to said signal transformer means and receiving alternating current representing alternating current signals to be applied to said central office therefrom, said amplifier means exhibiting a resistance which changes according to current received.

2. The apparatus according to claim 1 wherein said amplifier means comprises transistor means having base, emitter and collector electrodes, said transistor means having said emitter and collector electrodes connected to said two wires and said collector and base electrodes connected to said signal transformer means.

3. The apparatus according to claim 2 wherein said transistor means is connected to said two wires through rectifying bridge means.

4. The apparatus according to claim 2 additionally comprising voltage divider means, said voltage divider means including at least first and second interconnected resistors connected between said two wires provided from said central office, said first and second interconnected resistors having a junction therebetween connected to said base electrode of said transistor through a third resistor.

5. The apparatus according to claim 4 additionally comprising capacitor means connected intermediate said junctions and one of said two wires, said one of said two wires being connected to said emitter electrode of said transistor means.

6. The apparatus according to claim 1 wherein said signal transformer means is connected to ground at a winding thereof which is also connected to said subscriber telephone system.

* * * * *